(No Model.) 2 Sheets—Sheet 1.
E. R. STILWELL.
LIVE STEAM FEED WATER PURIFIER.
No. 427,018. Patented Apr. 29, 1890.
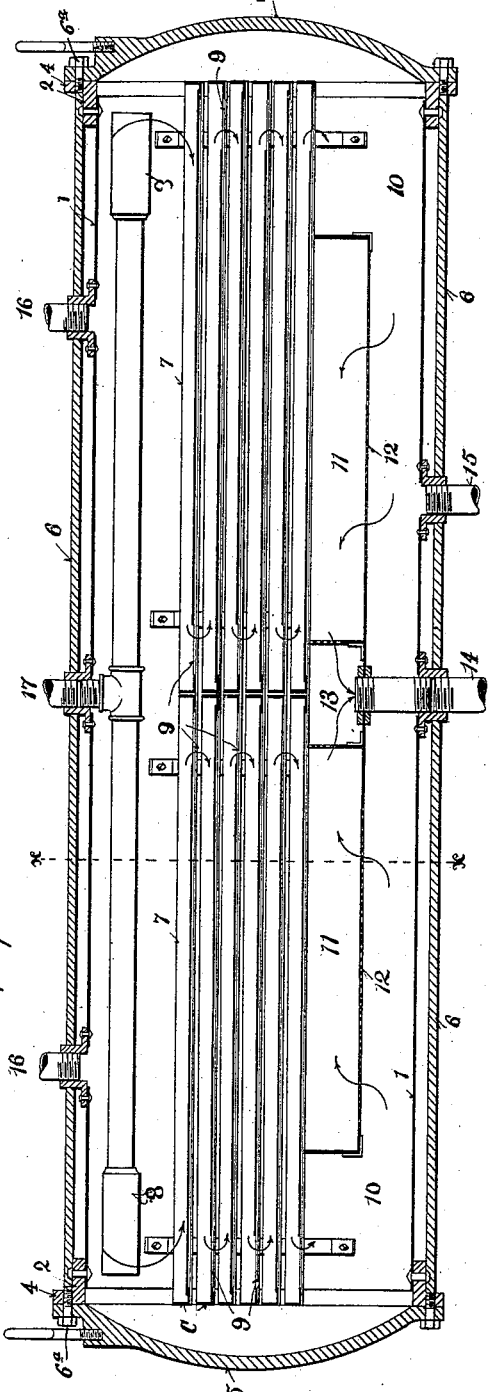
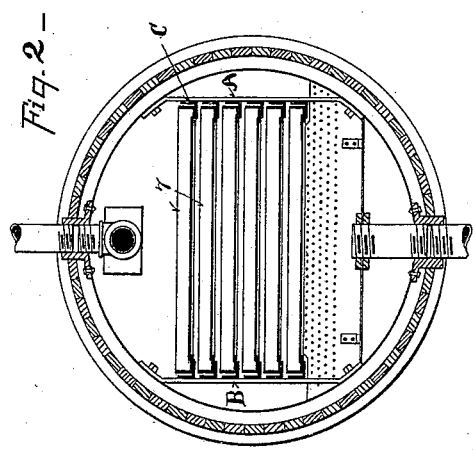
WITNESSES:
INVENTOR
Edwin R. Stilwell
BY Wood & Boyd
ATTORNEYS

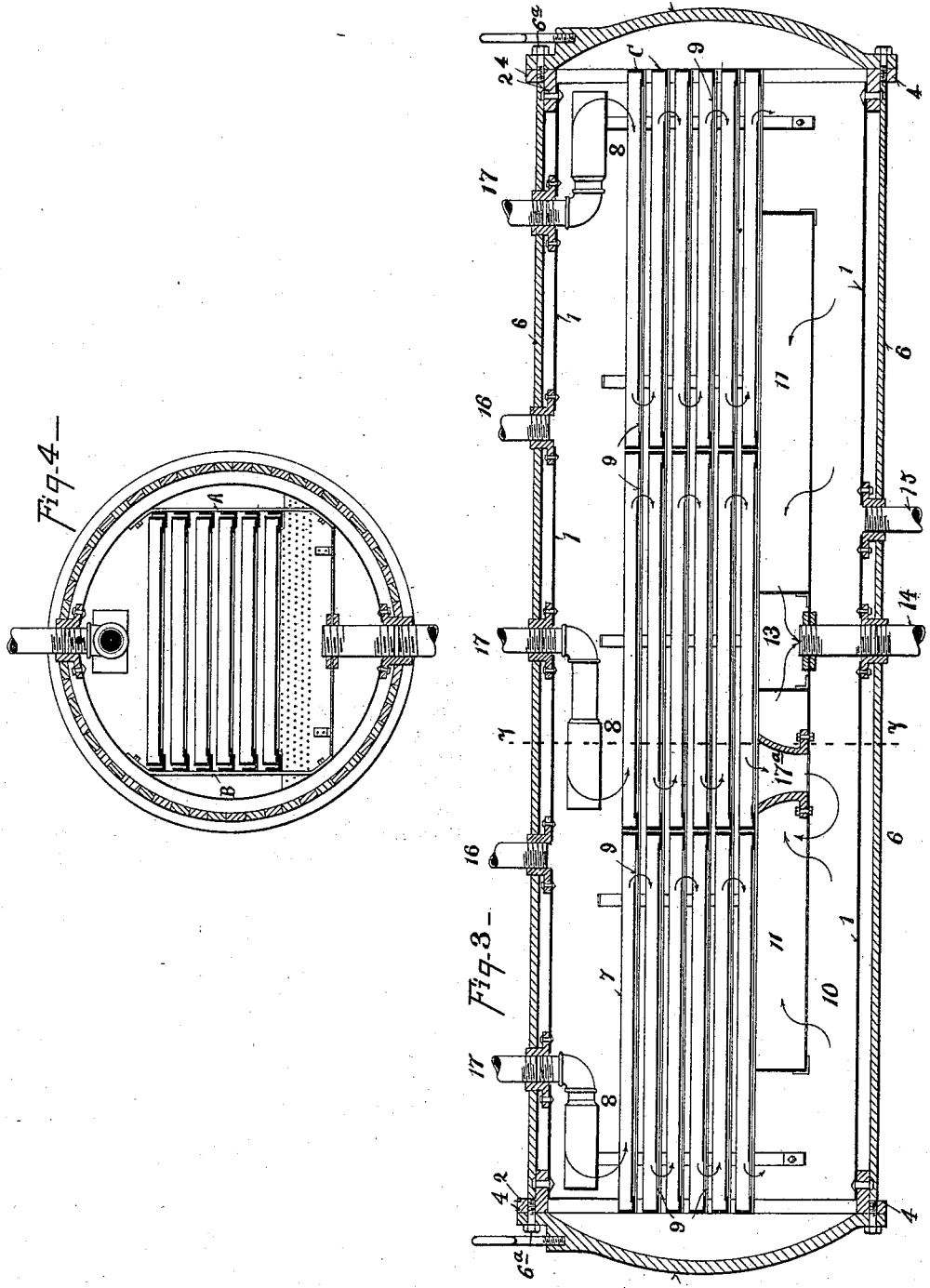

UNITED STATES PATENT OFFICE.

EDWIN R. STILWELL, OF DAYTON, OHIO, ASSIGNOR TO THE STILWELL & BIERCE MANUFACTURING COMPANY, OF SAME PLACE.

LIVE-STEAM FEED-WATER PURIFIER.

SPECIFICATION forming part of Letters Patent No. 427,018, dated April 29, 1890.

Application filed October 31, 1889. Serial No. 328,766. (No model.)

*To all whom it may concern:*

Be it known that I, EDWIN R. STILWELL, a citizen of the United States, and a resident of Dayton, in the county of Montgomery and State of Ohio, have invented certain new and useful Improvements in Live-Steam Feed-Water Purifiers, of which the following is a specification.

The object of my invention is to provide an efficient feed-water purifier for boiler-supplies.

Another object of my invention is to provide a device which can be used with live steam, so as to maintain the water in the purifier at the same temperature as the water in the boiler, as the deposition of minerals held in suspension by the water is more readily accomplished the higher the heat to which the water is subjected.
Another object of my invention is to provide a compact device, in which the maximum amount of area can be utilized for separating the impurities from the water, all of which will be fully set forth in the description and claims, reference being made to the accompanying drawings, making a part of this specification, in which—

Figure 1 is a longitudinal central vertical section of my improvement. Fig. 2 is a transverse section on line $x\,x$, Fig. 1. Fig. 3 is a modification of Fig. 1; and Fig. 4, a section on line $y\,y$, Fig. 3.

The shell of the purifier is placed horizontal for convenience, and it is elevated, preferably, so that the water purified will be discharged from the hot-water well directly into the boiler.

1 represents the shell of the purifier, preferably made of boiler-iron.
2 represents sectional cylinders, preferably made of cast-iron, to which the boiler-iron is riveted.

4 represents flanges projecting outward from the sectional cylinders 2, so as to form a base for the attachment of the cylinder-heads 5.

6 represents tie-bolts, which pass through the sectional cylinders and cylinder-heads and hold them rigidly in position, so as to make a steam-tight joint. The bolts 6 each extend continuously from one cylinder-head to the other, and thus the heads are tied together and the ends of each bolt are furnished with nuts $6^a$ to permit the heads to be detached.

It is a desideratum in the purification of water containing lime, magnesia, iron, or other mineral impurities to employ as large an area or surface as possible for the heated water to pass over in thin sheets, which allows the mineral to deposit on the pans or shelves. It is also necessary to have the pans or shelves readily removable from the purifier, so that their surfaces may be cleaned from the deposit which accumulates thereon.

7 represents the pans or shelves.

In Fig. 1 I have shown two series; in Fig. 3, three series of pans. Any number of series may be employed, according to the length of the purifier. The top pan receives the water from the overflow-box 8 at one end. The opposite end of the pan is provided with opening 9. The next pan underneath is provided with a similar opening 9 at the opposite end, and the next pan in the series under that at the opposite end. Thus water passes transversely over the pans in the direction shown by the arrows and falls into the mud-chamber 10 underneath the pans.

11 represents filter-chambers; 12, screens on the bottom of the filtering-chamber, so as to keep back the muddy portion of the water and allow the clear water to pass up through the filter and into the hot-well 13, from which it passes by pipe 14 into the boiler.

15 represents a blow-off pipe for blowing off the mud which accumulates in the mud-well 10.

16 represents the live-steam-supply pipes; 17, the water-supply pipe. The pans are held in position by means of standards A B, to which are rigidly attached angle-irons C. These angle-irons form ways on which are supported the pans 7. It will thus be seen that the pans or shelves are readily inserted or removed by removing the heads of the purifier and sliding the pans horizontally. The pans 7 are shown as made of angle-iron, the sides resting on the L-shaped brackets C, which is the preferred form of construction.

It will be observed that when two series of pans are used they discharge their water into the mud-well 10 at either end, and that the filter-chambers are centrally located between them and the water-well 13, tapped by pipe 14 between them, and when three series of pans are employed a pipe-connection 17ª is provided down through one of the filter-chambers 11 to allow the discharge from the central series of pans into the mud-well underneath. When the filter is constructed with the pans or shelves arranged as here shown, a very large area of metallic surface is provided, which can be easily removed and inserted and cheaply made.

The mode of operation is as follows: Live steam is admitted by pipes 16, and feed-water through pipe 17 by overflows 8, onto the pans or shelves 7. Water passes over said pans alternately in thin streams, and is subject to the heat of the live steam and raised to the same temperature as the boiler, to which it is connected by said steam-pipes. By the time it has passed over the series of pans it has become chiefly freed from its mineral impurities and passes into the sediment or mud chamber 10, the heavier portions of the mud settle, and the clear water passes up through the screen 12, through the filter material into hot-water well 13, from which it passes into the boiler from pipe 14, purified from all materials held in suspension.

Having described my invention, what I claim is—

1. A feed-water heater and purifier consisting of the cylindrical shell 1, the sectional cylinders 2, having flanges 4, the cylinder-heads 5, and a series of tie-bolts 6, each extending continuously from one cylinder-head to the other and detachably tying them together, substantially as shown and described.

2. A feed-water heater and purifier consisting of the cylindrical shell 1, having the heads 5, the standards A and B, rigidly fixed in the shell, and each provided with lateral angle-irons C, forming horizontal ways, and the horizontally-sliding pans 7, movable on said ways through the end of the shell, substantially as described.

3. A feed-water heater and purifier consisting of a cylindrical shell 1, having detachable heads 5, the standards A and B, arranged in said shell and provided with horizontal pan-supporting ways, and a series of pans 7, sliding horizontally on said ways into and out of the shell, substantially as described.

4. A feed-water heater and purifier consisting of the cylindrical shell 1, having the heads 5, the pans 7, having alternating end openings 9, the hot-water well 13, located in the shell beneath the pans and having a pipe 14 for connecting with a boiler, the mud-chamber 10, extending beneath the pans at each side of the hot-water well, and screens 12, arranged, respectively, at opposite sides of said well above the mud-chamber, substantially as described.

5. The combination, with a horizontal feed-water heater provided with removable heads at either end, of two or more series of pans, each receiving feed-water from a separate supply-orifice, and each series having a discharge-passage leading into a common mud-chamber beneath the shelves, and a filter-chamber located between said chamber and the hot-well, substantially as herein specified.

6. A feed-water heater and purifier consisting of a cylindrical shell 1, having within its lower portion a hot-water well 13, provided with a pipe 14 to connect with a boiler, and two independent sets of pans 7 7, located above and extending from opposite sides of the hot-water well toward the ends of the shell, substantially as described.

7. The combination, with a horizontal feed-water heater, of three or more series of pans, each receiving feed-water from a separate supply-orifice, and the central pan provided with the discharge-passage 17, leading through the mud-chamber 11 into the chamber 10, underneath the series of shelves, substantially as specified.

8. The combination, with the horizontal feed-water heater, of two or more series of pans, each receiving a separate supply of feed-water, each having its appropriate discharge-passage leading through the series of pans into a common chamber below the same, substantially as herein specified.

In testimony whereof I have hereunto set my hand.

EDWIN R. STILWELL.

Witnesses:
C. W. MILES,
T. SIMMONS.